G. G. White, Jr.,
Metal Base for Glass Vessels.
No. 93,935. Patented Aug. 17, 1869.
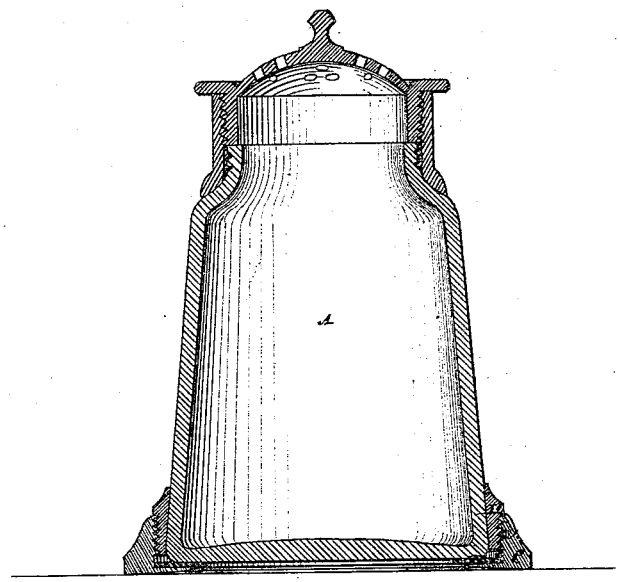
Witnesses.
Fred. Haynes
M. J. Shauly

United States Patent Office.

GEORGE C. WHITE, JR., OF BROOKLYN, NEW YORK.

Letters Patent No. 93,935, dated August 17, 1869.

IMPROVED METALLIC BASE FOR GLASS AND OTHER VESSELS.

The Schedule referred to in these Letters Patent and making part of the same.

*To all whom it may concern:*

Be it known that I, GEORGE C. WHITE, Jr., of the city of Brooklyn, in the county of Kings, and State of New York, have invented a new and useful Improvement in Metallic Bases to Glass and other Vessels, of which the following is a full, clear, and exact description, reference being had to the accompanying drawing, forming part of this specification, and which represents a glass sugar-sprinkler for table-use, having my improvement applied to it.

My improvement is designed to be applied to vessels made of glass or other fragile material, of various kinds and shape, such as, for instance, sugar, salt, pepper, and other sprinklers for table-use, soda-water and other tumblers, lager-beer glasses, decanters, and bottles or vessels, large or small, of different kinds, which, in their handling or use, are liable to chip or fracture at their bases by being suddenly or heavily brought down on the table, counter, or stand on which they are designed to be used, as, for instance, on surfaces composed of marble or other hard material. Metallic or protecting bases, as previously applied to such vessels, have been made in one piece, and of a recessed form, to receive freely within them the bases or bottoms of said vessels, that thus seated have been permanently secured within the metallic bases by cement interposed between the latter and the bottoms or lower edges of the vessel.

Such metallic bases are often not only unsightly by reason of the open or gaping character of the cement-joint just referred to, and liable to get loose or become detached by the immersion of them in hot water, in cleaning the vessels, and from other causes, but (and which is a more important feature,) do not, in many instances, afford that full and complete protection which is mainly their object to secure. This is due to the inflexible character of such bases, that being in one piece, and secured as described, form, as it were, a solid or integral portion of the vessel itself, and communicate in too direct a manner, when being brought suddenly or heavily down, shock upon the glass.

To obviate this and other objections is the object of my invention, which consists in a sectional construction of the metallic base by forming it of inner and outer ring-like pieces, the one fitting on to or round the lower portion of the vessel to be protected, while the other or outside piece, that constitutes the base proper, screws on over the former piece, so that not only may said base be removed when required, but shock is broken in being communicated to the glass, by the yielding character of the screw-threads that may be fitted loose, and whereby provision is made for inserting or renewing at pleasure an India-rubber or other soft or elastic packing between the outside piece or base proper and bottom of the vessel or inner metallic section secured to or carried by the vessel, which packing materially aids in neutralizing the effect of percussion on the glass in bringing the vessel suddenly or heavily down on a hard surface. A metallic base, too, thus constructed, may be made to ornament or improve the appearance of the vessel and add to its stability; also, in case of the vessel to which it is applied being fractured, may be readily fitted to another.

Referring to the accompanying drawing—

A represents a sugar-sprinkler or vessel for table-use, made of glass or other fragile material.

This vessel having no handle to interfere with the following mode of fitting on the metallic base, and being of an increasing size or diameter in a downwardly direction, the inner section B, of said base, may be made in one piece, of annular form, and be fitted on to the vessel by slipping it over the same, from the top thereof, and so that being made of a tapering character on its interior, it will fit snugly around the bottom of the vessel.

This section B has a screw-thread, $a$, cut around its exterior, on to which is screwed from below an outer section, C, that forms the base proper, and which, before putting it on, has inserted within it an India-rubber ring, D, that on the sections B and C being united, as described, forms a soft and elastic packing between said outer section and bottom of the vessel, that reduces shock or prevents injury to the screw-threads, which break communication between the base proper and portion of the metallic base carried by the vessel, and that materially and importantly serves to lessen shock generally on the vessel, on bringing the latter suddenly or heavily down on a hard surface.

In applying such sectional metallic base to vessels of different shape or configuration, as, for instance, vessels with a handle, or vessels having straight bodies, or bodies of a diminishing taper in a downward direction, either throughout their length or at their base, then the inner section B, which may either be made whole or in pieces, must be fitted to its place by lateral adjustment, or from below, as by screwing it on to a thread cut on the glass, cementing it to the vessel, or otherwise securing it, after which the outer section C, having the rubber or other suitable packing within it, is screwed on to the inner section, as before.

What is here claimed, and desired to be secured by Letters Patent, is—

1. A metallic base to glass and other fragile vessels, made in sections, the one of which is fitted on to or around the vessel, at or near its bottom, while the other section that forms the base proper, is connected with the first or inner section by a screw-thread or threads, substantially as specified.

2. The combination of the soft packing D with the outer section C of the metallic base, and the inner section B, fitted to surround the lower portion of the vessel, and having a screw-thread, $a$, upon its exterior, to receive on or over it the outer section, all for operation in connection with the bottom of the vessel, and to more effectually protect the same, and to prevent jamming or injury of the screw-thread, $a$, essentially as herein set forth.

G. C. WHITE, Jr.

Witnesses:
JOHN D. ROSSET,
HENRY PALMER.